United States Patent Office 3,400,125
Patented Sept. 3, 1968

3,400,125
UNSYMMETRICAL 6-PURINYL DISULFIDES
Frank J. Stiefel, Princeton Junction, Bernard J. Ludwig,
North Brunswick, and Frank M. Berger, Princeton,
N.J., assignors to Carter-Wallace, Inc., New York, N.Y.,
a corporation of Maryland
No Drawing. Continuation-in-part of application Ser. No.
264,770, Mar. 13, 1963. This application Feb. 4, 1966,
Ser. No. 525,131
12 Claims. (Cl. 260—247.1)

ABSTRACT OF THE DISCLOSURE

A class of unsymmetrical 6-purinyl disulfide compounds which have antineoplastic activity in laboratory animals. Representative compounds include methyl-6-purinyl disulfide, (4-morpholino)-6-purinyl disulfide, phenyl-6-purinyl disulfide, and (1-piperidino)-6-purinyl disulfide.

The present application is a continuation-in-part application of U.S. Ser. No. 264,770, filed Mar. 13, 1963, now abandoned.

The present invention relates to a new class of unsymmetrical disulfides. More particularly, the present invention relates to novel 6-purinyl disulfide compounds which have marked antineoplastic activity.

The compounds of the present invention can be represented by the following general formula:

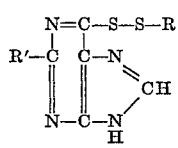

wherein R represents a radical selected from the group consisting of lower alkyl, aryl, aralkyl, di-(lower alkyl) amino, cyclic secondary amino and trichloromethyl and R' represents hydrogen or amino. As used herein and in the appended claims, the term "lower alkyl" signifies an alkyl radical having from 1 to 6 carbon atoms.

As examples of suitable lower alkyl radicals there may be mentioned methyl, ethyl, isopropyl and n-hexyl; as aryl radicals there may be mentioned phenyl and substituted phenyl. Illustrative aralkyl radicals are phenyl-(lower alkyl) radicals such as benzyl, phenethyl and the like.

The di-(lower alkyl) amino radicals of the present invention may be symmetrical or unsymmetrical. Therefore, illustrative di-(lower alkyl) amino radicals include, for example, dimethylamino, diethylamino and di-n-butylamino as well as methylethylamino and ethyl-n-butylamino.

The cyclic secondary amino radicals of the invention are unsubstituted monoheterocyclic radicals wherein the amino nitrogen is part of the ring. The heterocyclic ring can contain, in addition to the nitrogen, other hetero atoms, such as oxygen, sulfur or additional nitrogen. Illustrative cyclic secondary amino radicals include, for example, piperidino, morpholino, and thiomorpholino.

Illustrative novel compounds of the present invention are, for example, methyl-6-purinyl disulfide, ethyl-6-purinyl disulfide, phenyl-6-purinyl disulfide, (p-tolyl)-6-purinyl disulfide, diethylamino-6-purinyl disulfide, (4-morpholino)-6-purinyl disulfide, (1-piperidino)-6-purinyl disulfide, methyl-6-(2-aminopurinyl) disulfide, phenyl-6-(2-aminopurinyl) disulfide, diethylamino - 6 - (2-amino-purinyl) disulfide, (4-morpholino)-6-(2 - aminopurinyl) disulfide, (1-piperidino) - 6 - (2-aminopurinyl) disulfide, benzyl-6-purinyl disulfide, benzyl-6-(2-aminopurinyl) disulfide and trichloromethyl-6-purinyl disulfide.

The novel compounds of the present invention can be prepared by the reaction of 6-mercaptopurine or 2-amino-6-mercaptopurine with a sulfenyl chloride of the general formula:

R—S—Cl wherein R is as defined above. The aforementioned reaction is carried out in a medium, and at a temperature, in which the purine derivative is sufficiently soluble for reaction to proceed, e.g., carrying out the reaction in pyridine solvent at a temperature of 80–90° C. for a short period of time, e.g., 5 minutes. The sulfenyl chloride reactant can be prepared by the method described in Methoden der Organishchen Chemie, Houben-Weyl, V. 11/2, 745 (1958) and further illustrated hereinafter.

The compounds of the present invention possess antineoplastic properties and thus are extremely useful in inhibiting the growth of cancer tissue. For example, the mean survival time of mice of the CFI strain infected with Ehrlich's ascites carcinoma is substantially doubled by the administration of (4-morpholino)-6-purinyl disulfide.

In the following examples, Example 1 illustrates the preparation of the (4-morpholino) sulfenyl chloride intermediate and Example 2 illustrates the preparation of the novel (4-morpholino)-6-purinyl disulfide.

Example 1

In a stirred suspension of 100 g. of di(4-morpholino) disulfide in 80 ml. of dry carbon tetrachloride there is passed anhydrous chlorine. The temperature of the reaction mixture is maintained in the range of from 0° to 5° C. during the addition and the addition is continued until potassium iodide-starch paper indicates that a slight excess of chlorine is present. The excess chlorine is then removed by passing a stream of inert gas through the reaction mixture. The clear colored solution is treated with activated charcoal and the solvent is removed under diminished pressure with the exclusion of moisture. There is obtained as a reddish-brown liquid residue 120 g. of crude 4-morpholino sulfenyl chloride. Distillation of said residue under reduced pressure yields pure (4-morpholino) sulfenyl chloride, B.P. 64–66° C./0.5 mm.

Example 2

To a suspension of 10 parts of 6-mercaptopurine in 100 parts of pyridine there was added 15.3 parts of (4-morpholino) sulfenyl chloride. The mixture was heated with stirring at a temperature of from 80° to 90° C. for a period of about 5 minutes. The resulting clear solution was cooled and added to 500 parts of water. The resulting precipitate was removed by filtration, washed with water and recrystallized from methanol. There was obtained approximately 3 parts of (4-morpholino)-6-purinyl disulfide.

Table 1 illustrates the physical properties of some of the novel compounds of the present invention.

TABLE 1

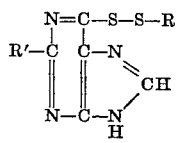

R'=Hydrogen

TABLE 1.—Continued

| R | M.P., °C. | Formula | Analysis Calc. | Analysis Found |
|---|---|---|---|---|
| Methyl | 184–186 | $C_6H_6N_4S_2$ | C, 36.4<br>H, 3.0<br>N, 28.2<br>S, 32.3 | 36.6<br>3.0<br>28.1<br>32.2 |
| Phenyl | 157–159 | $C_{11}H_8N_4S_2$ | C, 50.6<br>H, 3.1<br>N, 21.5<br>S, 24.6 | 50.9<br>3.3<br>21.3<br>24.3 |
| 4-morpholino | 177–179 | $C_9H_{11}N_5OS_2$ | C, 40.2<br>H, 4.1<br>N, 26.0<br>S, 23.8 | 40.1<br>4.2<br>25.8<br>23.7 |
| 1-piperidino | 160–161 | $C_{10}H_{13}N_5S_2$ | C, 44.9<br>H, 4.9<br>N, 26.2<br>S, 24.0 | 44.6<br>5.0<br>26.0<br>24.0 |

In a manner similar to that illustrated in Example 2, the reaction of (4-morpholino) sulfenyl chloride with 2-amino - 6 - mercaptopurine yields (4 - morpholino) - 6-(2-aminopurinyl) disulfide.

When used as antineoplastic agents, the disulfide compounds of this invention are preferably administered orally in the form of tablets, capsules, or the like. The disulfide compounds may also be administered by injection using a suspension of the compound in water or isotonic saline solution or a solution of the compound in a solvent consisting of aqueous propylene glycol or polyethylene glycol. In addition to the active ingredient, the tablet contains conventional fillers, excipients, lubricants, etc. The disulfide compound is generally in an amount from 25 to 90% by weight of the total composition. Typical examples of such tablets or capsules are those containing the disulfide active ingredient in an amount of from 10 to 100 mg., preferably 50 mg.

The following Examples A–F are specific examples of tablets containing the disulfide active ingredients of this invention:

EXAMPLE A

| | Mg. |
|---|---|
| Methyl-6-purinyl disulfide | 50 |
| Corn starch | 100 |
| Magnesium stearate | 2 |
| Alginic acid | 8 |

EXAMPLE B

| | Mg. |
|---|---|
| Phenyl-6-purinyl disulfide | 25 |
| Corn starch | 75 |
| Magnesium stearate | 1.5 |
| Alginic acid | 2.5 |
| Gum acacia | 2.5 |

EXAMPLE C

| | Mg. |
|---|---|
| (N-dimethylamino)-6-purinyl disulfide | 100 |
| Corn starch | 50 |
| Magnesium stearate | 2 |
| Alginic acid | 8 |

EXAMPLE D

| | Mg. |
|---|---|
| (4-morpholino)-6-purinyl disulfide | 50 |
| Corn starch | 50 |
| Magnesium stearate | 1.5 |
| Alginic acid | 5 |

EXAMPLE E

| | Mg. |
|---|---|
| (1-piperidino)-6-purinyl disulfide | 75 |
| Corn starch | 75 |
| Magnesium stearate | 2 |
| Alginic acid | 8 |

EXAMPLE F

| | Mg. |
|---|---|
| Benzyl-6-(2-aminopurinyl) disulfide | 50 |
| Corn starch | 100 |
| Magnesium stearate | 2 |
| Alginic acid | 8 |

What we claim is:

1. A compound of the formula:

$$\begin{array}{c} N=C-S-S-R \\ | \quad | \\ R'-C \quad C-N \\ \quad \| \quad \| \quad \diagdown CH \\ N-C-N \diagup \\ \quad | \\ \quad H \end{array}$$

wherein R represents a member selected from the group consisting of lower alkyl, phenyl, (lower alkyl)-phenyl, phenyl-(lower alkyl), di-(lower alkyl) amino, piperidino, morpholino, thiomorpholino, and trichloromethyl, and R' is selected from the group consisting of hydrogen and amino.

2. A compound as claimed in claim 1 wherein R is methyl and R' is hydrogen.

3. A compound as claimed in claim 1 wherein R is N-diethylamino and R' is hydrogen.

4. A compound as claimed in claim 1 wherein R is 4-morpholino and R' is hydrogen.

5. A compound as claimed in claim 1 wherein R is 1-piperidino and R' is hydrogen.

6. A compound as claimed in claim 1 wherein R is p-tolyl and R' is hydrogen.

7. A compound as claimed in claim 1 wherein R is benzyl and R' is hydrogen.

8. A compound as claimed in claim 1 wherein R is phenyl and R' is hydrogen.

9. A compound as claimed in claim 1 wherein R is benzyl and R' is amino.

10. A compound as claimed in claim 1 wherein R is methyl and R' is amino.

11. A compound as claimed in claim 1 wherein R is p-tolyl and R' is amino.

12. A compound as claimed in claim 1 wherein R is phenyl and R' is amino.

References Cited

FOREIGN PATENTS 993,302   5/1965   Great Britain.

NICHOLAS S. RIZZO, *Primary Examiner.*

R. J. GALLAGHER, *Assistant Examiner.*